Figure 1:
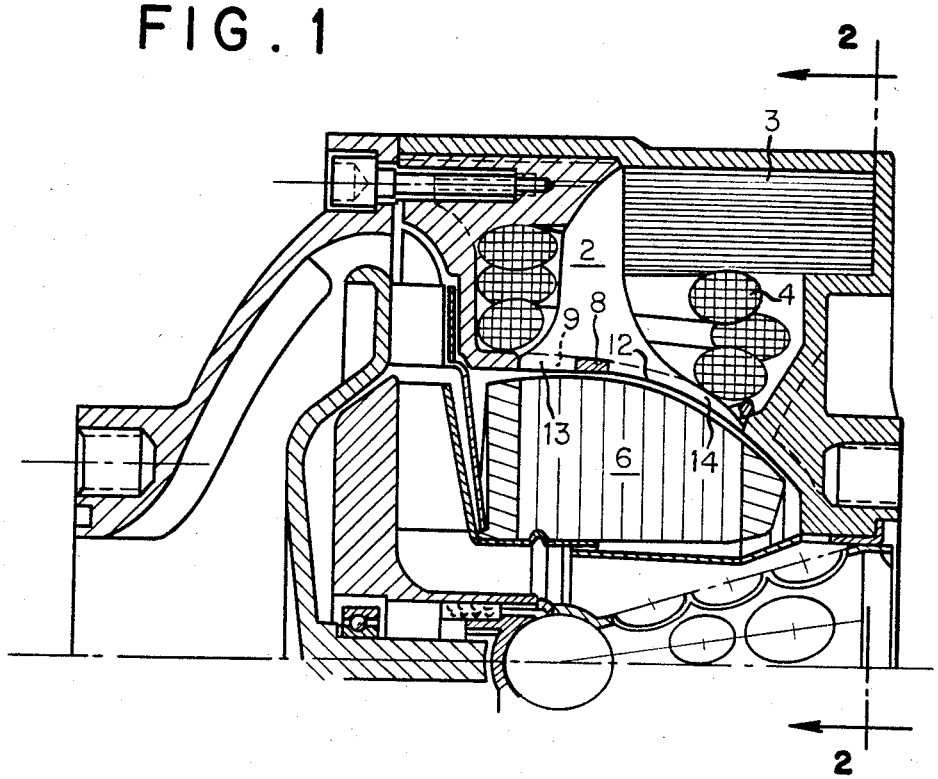

United States Patent [19]

Laing

[11] Patent Number: 4,593,219

[45] Date of Patent: Jun. 3, 1986

[54] POLE SHOE RING FOR ELECTRICAL MACHINES

[76] Inventor: Karsten Laing, 632 Marsat Ct., Chula Vista, Calif. 92011

[21] Appl. No.: 667,696

[22] Filed: Nov. 2, 1984

[51] Int. Cl.⁴ .............................................. H02K 1/18
[52] U.S. Cl. .................................... 310/218; 310/166; 310/217
[58] Field of Search .................... 310/166, 91, 86, 87, 310/90, 254, 217, 218, 104, 179, 216, 258; 417/420; 384/120

[56] References Cited

U.S. PATENT DOCUMENTS

| | | | |
|---|---|---|---|
| 3,645,650 | 2/1972 | Laing | 310/104 |
| 3,649,137 | 3/1972 | Laing | 310/104 |
| 3,723,029 | 3/1973 | Laing | 417/420 |
| 4,471,253 | 9/1984 | Laing | 310/166 |

Primary Examiner—R. Skudy
Attorney, Agent, or Firm—Pennie & Edmonds

[57] ABSTRACT

Pole shoe elements for widening the teeth of an electrical machine of spherical-gap type. The machine includes a plurality of teeth. Each tooth has a groove, so that H-shaped element with a strap is adapted to fit within a groove of each tooth. A plurality of such shoe elements forming a ring by a connection strap between adjacent pole shoe elements.

1 Claim, 4 Drawing Figures

POLE SHOE RING FOR ELECTRICAL MACHINES

The invention refers to pole shoes for electrical machines, in particular those having a spherical gap for the magnetic flux, in which the stator exhibits teeth which in the circumferential direction run essentially between radii and extend through the windings.

Conventional electrical machines exhibit a cylindrical gap for the magnetic flux and are built up from sections of laminations stacked into packs. The teeth point inwards and end in pole shoes which lead to a very small clearance between two adjacent teeth. Electrical machines having spherical gaps for the magnetic flux have independent teeth connected together by magnetic yoke packs. Their distance apart is at the ends pointing inwards so great that pole shoe elements become necessary in addition for widening the teeth in the region adjoining the rotor.

The idea is known, of effecting that kind of widening of teeth through soft iron profiles. The disadvantage consists in the fact that for an electrical machine having, e.g., 36 teeth, 72 independent soft iron pieces become necessary, each of which needs fixing. The idea is further known, of arranging between the teeth and the airgap thinwalled soft iron segments. This method has the disadvantage that the magnetic flux passes perpendicularly through these soft iron segments, whereby extraordinarily heavy eddy currents are generated, which may dissipate up to 20% of the input power.

The invention avoids the disadvantages of both solutions. In accordance with the invention a closed ring is inserted, which consists of the pole shoe elements which widen the teeth, so that the flux density in the gap is reduced. Moreover it is provided that between every two of these pole shoe elements connecting straps remain through which the pole shoe elements which respectively widen one tooth become connected together mechanically and magnetically. The magnetic flux is thereby fed from the tooth into the adjacent pole shoe elements. It is further provided that at one axial end of the ring formed from the now H-shaped elements very thin straps remain between respectively adjacent H-elements, to which belongs only a mechanical function.

The invention is to be explained with the aid of Figures.

Figure 2:
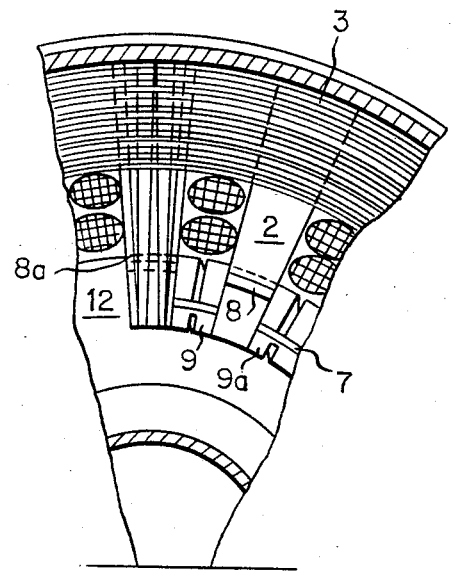
Figure 3:
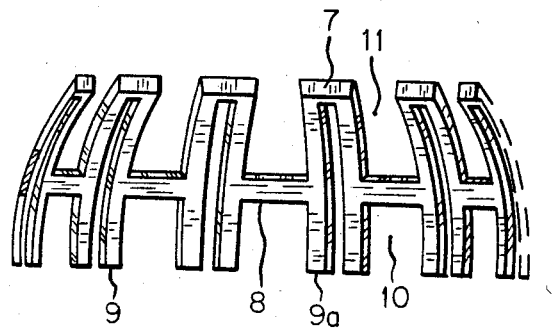
Figure 4:
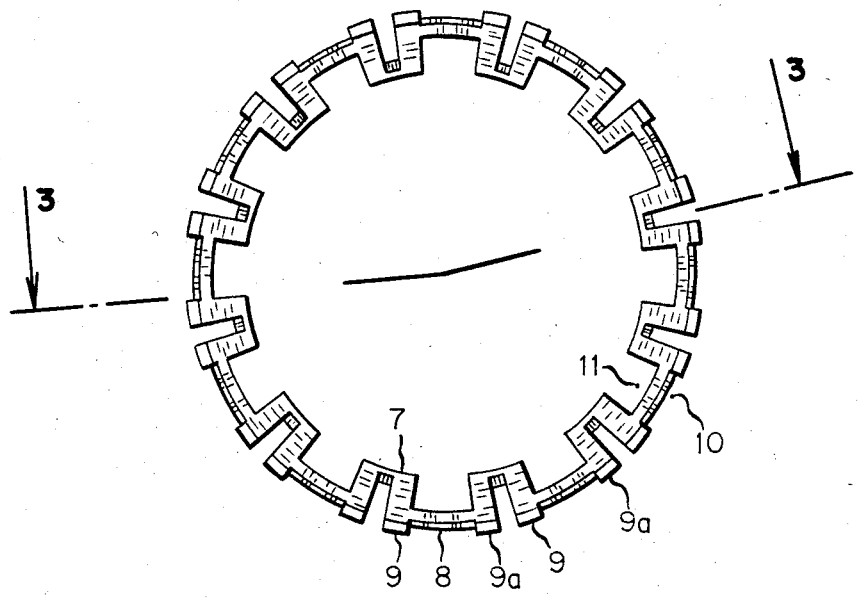

FIG. 1—shows a motor having discrete teeth;

FIG. 2—shows a sector out of the motor in accordance with FIG. 1, sectioned along a plane of rotation in accordance with the line of section II—II;

FIG. 3—shows the ring in accordance with the invention sectioned in side elevation; and FIG. 4—shows this ring in plan.

In FIGS. 1 and 2 a motor-centrifugal pump unit having a spherical gap for the magnetic flux is shown, in which the teeth (2) are formed by a plurality of laminations which run radially. For the return of the magnetic flux a spiral winding (3) is provided. Between the teeth (2) lies the winding (4). For widening the area of the teeth (2) next the rotor (6) in the circumferential direction, the soft iron regions or pieces (9) are provided. The two soft iron regions (9, 9a) respectively enclosing one tooth (2) and strap (8) extends through the pole so that H-shaped elements are formed.

From FIG. 3 it may be seen that straps (7) connect a plurality of H-shaped pole shoe elements of adjacent teeth. The shoe elements, consisting of the soft iron regions (9) and the straps (8), are connected by straps (7) of the smallest possible cross-section.

FIG. 4 shows a plan view of the ring of pole shoe element in accordance with the invention, which is shown sectioned in FIG. 3. The ring is mounted on the dividing wall (12) between the stator and the rotor in accordance with FIG. 1. After the teeth (2) are inserted by pushing the inwards-pointing projections (13) and (14) into the recesses (10) and (11) in the ring, and fitting strap (8) into the recess between projections (13) and (14).

I claim:

1. A pole shoe element for widening the teeth of electrical machines having discrete teeth, in particular of electric motors having a spherical gap for the magnetic flux, characterized in that each tooth (2) has a groove (8a) running in the circumferential direction and that soft iron pieces (9 and 9a) serving to widen one tooth (2) are connected together by a strap (8) forming with said soft iron pieces an H-shaped pole shoe element, said strap (8) adapted to fit within said groove (8a) in said tooth (2) and that each of a plurality of H-shaped pole shoe elements (9, 8, 9a) is united into a ring with adjacent H-shaped pole shoe elements connected by straps (7) of small cross section, which lie at one axial end of the ring.

* * * * *